United States Patent [19]

Lehmann

[11] 4,429,446

[45] Feb. 7, 1984

[54] ROLL FOR A ROLLING MILL

[75] Inventor: Rolf Lehmann, Rudolfstetten, Switzerland

[73] Assignee: Escher Wyss Aktiengesellschaft, Zurich, Switzerland

[21] Appl. No.: 365,365

[22] Filed: Apr. 5, 1982

[30] Foreign Application Priority Data

May 6, 1981 [CH] Switzerland .................... 2943/81

[51] Int. Cl.³ ............................................ B21B 29/00
[52] U.S. Cl. ................................... 29/116 AD; 72/241
[58] Field of Search ................... 72/241, 243, 245, 16;
73/37.7; 29/113 AD, 116 AD

[56] References Cited

U.S. PATENT DOCUMENTS 3,879,827  4/1975  Lehmann ..................... 29/116 AD
4,106,405  8/1978  Biondetti et al. ............. 29/116 AD Primary Examiner—Lowell A. Larson
Assistant Examiner—Jorji M. Griffin
Attorney, Agent, or Firm—Werner W. Kleeman

[57] ABSTRACT

A roll for use in a rolling mill contains a stationary roll support or beam and a tubular roll shell rotatable about the stationary roll support. A hydrostatic pressure chamber or space is located between the stationary roll support and the rotatable roll shell. Substantially punch or piston-like pressure or support elements are provided for the roll, these pressure or support elements being located essentially in the plane of symmetry of the pressure chamber at the side of the stationary roll support which faces away from the pressure chamber.

3 Claims, 4 Drawing Figures

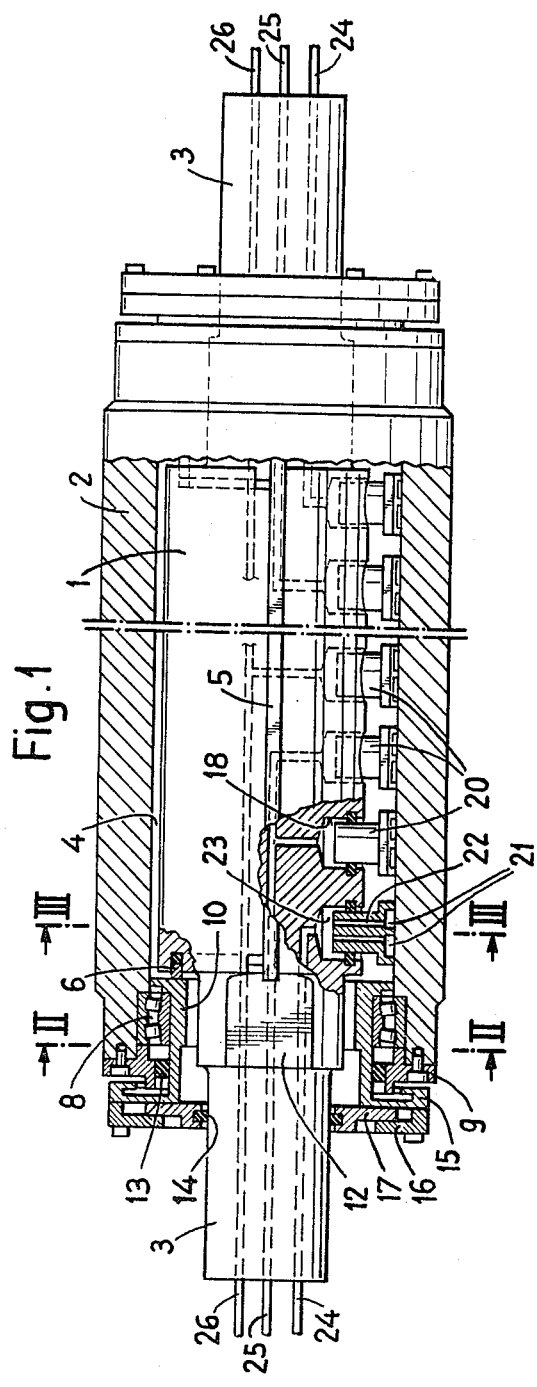
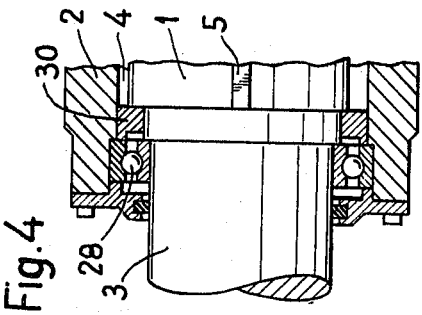
Fig. 4
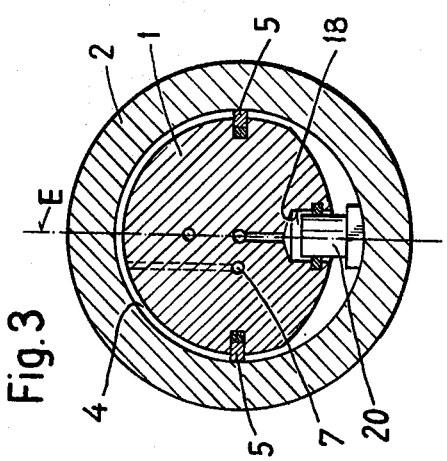
Fig. 3
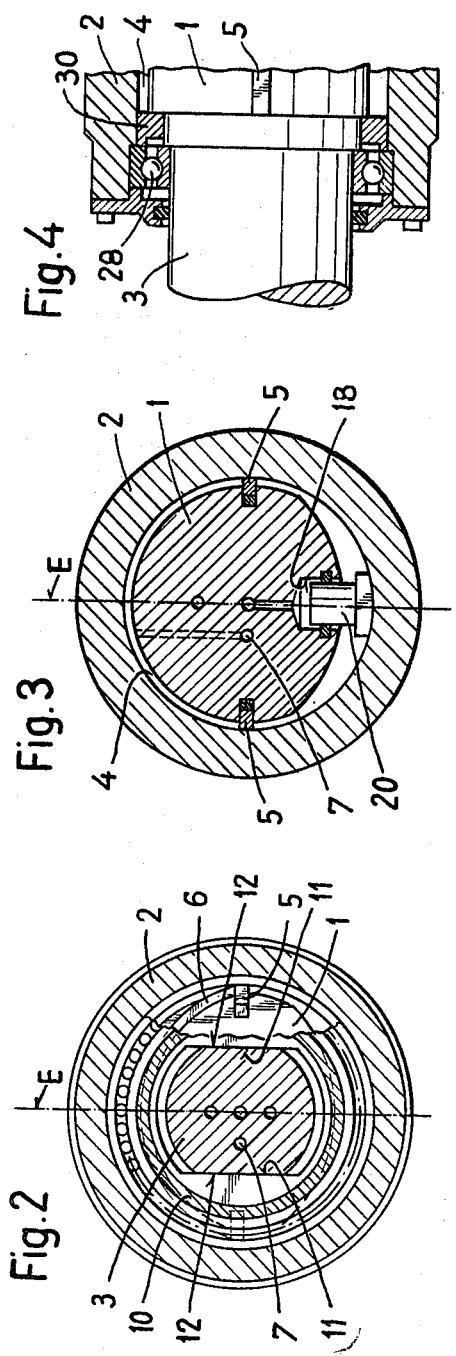
Fig. 2

ROLL FOR A ROLLING MILL

BACKGROUND OF THE INVENTION

The present invention relates to a new and improved construction of a roll for a rolling mill.

Generally speaking, the roll for a rolling mill of the present development is of the type containing a stationary roll support or beam and a substantially tubular-shaped roll shell rotatable about the stationary roll support. Between the roll support and the roll shell there is disposed a hydrostatic pressure chamber or space which is sealed by suitable sealing elements, typically sealing ledges. The pressure chamber can be connected so as to flow communicate with a source of pressurized fluid medium. Additionally, there are provided punch or piston-like pressure or support elements which can be operatively connected with at least one source of pressurized fluid medium. These pressure or support elements are located in the plane of symmetry of the pressure chamber.

A roll of this type has been disclosed to the art in German Pat. No. 2,332,861 and the corresponding U.S. Pat. No. 3,879,827, granted Apr. 29, 1975. This state-of-the-art roll combines the advantages of a roll having a pressure chamber, for instance of the type disclosed in German Pat. No. 1,193,739, and a roll containing punch-like pressure or support elements, for instance as known from U.S. Pat. No. 3,802,044, granted Apr. 9, 1974.

With the heretofore known roll construction the pressure or support elements are located within the pressure chamber at its plane of symmetry and are effective, by means of their pressure force, in the same direction as such pressure chamber. The infeed of the hydraulic pressurized fluid medium into the pressure chamber is accomplished by means of the pressure or support elements, in the cylindrical compartment or chamber of which there thus must prevail a higher pressure than in the pressure chamber.

Although, as a rule, this higher pressure is desired for the purpose of obtaining a corresponding pressure force for the pressure or support elements, there are however situations where such type of correlative action or association is undesirable and where, for instance, smaller pressure forces would be adequate for controlling the sag or bending behavior of the roll.

SUMMARY OF THE INVENTION

Therefore, it is a primary object of the present invention to provide a new and improved construction of roll for a rolling mill which is not afflicted with the aforementioned drawbacks and limitations of the prior art constructions.

Another and more specific object of the present invention aims at the provision of a new and improved construction of roll of the previously mentioned type wherein it is possible to separate from one another the pressure conditions prevailing in the pressure chamber and in the cylindrical compartments or chambers receiving the pressure or support elements.

Now in order to implement these and still further objects of the invention which will become more readily apparent as the description proceeds, the roll of the present development is manifested by the features that the pressure or support elements are located at the side of the stationary roll support facing away from the pressure chamber.

With such type of construction of roll it is possible to mutually independently determine or control the pressures prevailing in the pressure chamber and the forces exerted by the pressure or support elements by selecting the pressure prevailing in the substantially cylindrical compartments or chambers of the pressure or support elements, which affords advantages in certain instances with respect to energy requirements.

In this regard reference is made to German Pat. Pub. No. 2,737,346 which discloses a roll wherein a support element in the form of a hydrodynamically effective support ledge is located externally of a hydraulic pressure chamber. However, this support ledge is not located in the plane of symmetry of the pressure chamber and also does not therefore serve for influencing the bending or sag behavior of the roll, rather only for taking-up the inherent weight of its roll shell.

Finally, in the article entitled "Die VARIO-Schwimmende Walze Küsters zur Beeinflussung der Linienkraftverteilung", appearing in the publication "Das Papier", Volume 5, 1980, pages 165–168, there is disclosed a roll wherein there can be obtained a similar effect by mounting ring elements in the pressure chamber. These ring elements function as pressure sinks, i.e. zones containing a lower pressure. However, here also there exists the aforementioned coupling or correlation between the pressure in the pressure chamber and in the pressure sink, since in the pressure sink the pressure can be dropped at most from the pressure prevailing in the pressure chamber to atmospheric pressure. Additionally, the ring elements, which delimit the pressure sinks, possess sealing ledges which cause localized friction at the roll shell. Consequently, thermal deformations can arise which, at the very least, renders more difficult an exact operation with such type rolls.

The pressure or support elements of the inventive roll preferably can be constructed in the form of punches having hydrostatic bearing pockets in the manner disclosed in the aforementioned U.S. Pat. No. 3,802,044. The bearing pockets are connected by throttle channels or bores with a cylinder or space arranged between the punch and the roll support. Such type of pressure or support elements function practically free of friction, since with such roll design there can be maintained a hydrostatic lubricant film having an exactly predeterminable thickness between the support surfaces of the pressure or support elements and the therewith coacting roll shell surface.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a schematic view of a first exemplary embodiment of roll for a rolling mill constructed according to the invention, and shown partially in sectional view;

FIG. 2 is a cross-sectional view of the roll depicted in FIG. 1, taken substantially along the line II—II thereof;

FIG. 3 is a cross-sectional view of the roll depicted in FIG. 1, taken substantially along the line III—III thereof; and FIG. 4 is a fragmentary sectional view, corresponding to the illustration of FIG. 1, of a modified construction of roll according to the invention.

DETAILED DESCRIPTION OF THE PREFERRED EMBODIMENTS

Describing now the drawings, it is to be understood that only enough of the construction of the exemplary embodiments of rolls disclosed herein and intended for use in a rolling mill have been shown in the drawings as will enable those skilled in the art to readily understand the underlying principles and concepts of the present development, while simplifying the illustration of the drawings. Turning attention now to FIGS. 1 to 3, the exemplary embodiment of roll depicted therein will be seen to contain a stationary roll support 1 and a substantially tubular-shaped roll shell or jacket 2 mounted to be rotatable about the stationary roll support or beam 1. This roll support or beam 1 is provided with journals 3 or equivalent structure which are intended for supporting the roll in a roll stand or framework of a not particularly illustrated rolling mill. Between the stationary roll support 1 and the rotatable roll shell 2 there is located a hydrostatic pressure chamber or space 4 which is sealed by appropriate sealing elements, here in the form of sealing ledges 5, at the longitudinal sides thereof, and by further sealing ledges or elements 6 at the end faces or sides of such pressure chamber 4. Within the pressure chamber 4 there opens a pressure line 7 which extends through one of the journals 3 and serves for the supply or infeed of a suitable pressurized fluid medium, typically oil. Pressure line or conduit 7 thus constitutes a pressurized medium-supply source for the pressure chamber 4.

The opposite ends of the roll shell 2 are rotatably mounted by means of roller bearings 8 or equivalent structure upon guide sleeves or bushings 10. As best seen by referring to FIG. 2, the guide sleeves 10, only one of which has been conveniently shown in the illustration, each are provided with parallel guide surfaces 11, and such guide sleeves 10 are guided at their guide surfaces 11 along appropriately configured parallel guide surfaces 12 provided at the roll support 1 in the pressing or contact direction, i.e. in the direction of the plane of symmetry E of the pressure chamber 4 (FIG. 3). The not particularly referenced intermediate space between the roll shell 2 and the roll support 1 is closed towards the outside at the roll ends by a suitable sealing arrangement or seal means which, in the exemplary embodiment under discussion, contains two sealing rings 13 and 14, a disk or plate 9 suitably connected with the roll shell 2, as shown in FIG. 1, two disks or plate members 15 and 16 rigidly connected with the related guide sleeve or bushing 10, and a movable disk or plate member 17 displaceably guided between the disks or plate members 15 and 16 and in which there is located the aforementioned seal or sealing ring 14.

As also will be recognized by reverting to FIGS. 1 and 3, there are formed at the side of the stationary roll support 1 facing away from or diametrically opposite the pressure chamber 4, in such stationary roll support 1, cylindrical bores or compartments 18 in which there are guided punch or piston-like pressure or support elements 20. These pressure or support elements 20, which can be constructed in accordance with the teachings of the aforementioned U.S. Pat. No. 3,802,044, contain hydrostatic bearing pockets 21 which flow communicate by means of throttle bores or channels 22 with the cylindrical space or chamber 23 provided in the related bore or compartment 18. As to the mode of operation of such pressure or support elements 20 reference may be made to the aforementioned U.S. Pat. No. 3,802,044. As particularly well seen by inspecting FIGS. 1 and 2, the support or pressure elements 20 are arranged to form groups which can be connected by separate supply lines or conduits 24, 25 and 26 to a not particularly illustrated supply device, as is well known in this art. The groups of pressure or support elements 20 can be acted upon or supplied with different controllable pressures in order to obtain different force effects.

As best seen by referring to FIG. 3, the pressure or support elements 20 act by means of their pressure or supporting force in a direction which is opposite to the pressure force exerted by the pressure or support chamber 4. This pressure chamber 4 functions in known manner so as to exert a uniform pressure force upon the roll shell 2, whereas the pressure or support elements 20 can act at localized regions opposite to such exerted pressure force in a desired fashion. The roll shell 2 is therefore exposed to a resultant force which is derived from the difference of these counteracting forces.

Although in the drawings there have been schematically shown a uniform distribution or division of the pressure or support elements 20, it should be understood that, depending upon requirements, these pressure or support elements 20 also can be assembled together into groups and powered with the required pressures.

Continuing, as will be seen from the modified construction depicted in FIG. 4 the teachings of the invention are also applicable in conjunction with rolls wherein the rotatable roll shell 2 is directly mounted by means of roller bearings 28 or equivalent structure upon the roll support or beam 1 or its journals 3. In order to seal the pressure chamber 4, in this case there are provided, in known manner, closure rings or ring members 30 at its opposite end faces or end regions.

While there are shown and described present preferred embodiments of the invention, it is to be distinctly understood that the invention is not limited thereto, but may be otherwise variously embodied and practiced within the scope of the following claims.

What I claim is:

1. A roll for a rolling mill comprising:
   a stationary roll support;
   a substantially tubular-shaped roll shell mounted for rotation about said stationary roll support;
   said rotatable tubular-shaped roll shell and said stationary roll support cooperating with one another so as to define therebetween a hydrostatic pressure chamber;
   means operatively associated with said roll support for sealing said pressure chamber;
   pressurized fluid medium source means communicating with said pressure chamber for infeeding a pressurized fluid medium to said pressure chamber;
   substantially punch-like support elements provided between the stationary roll support and said rotatable roll shell and located essentially in a plane of symmetry of said pressure chamber;
   means operatively associated with said roll support defining at least one source of pressurized fluid medium for infeeding a pressurized fluid medium to said punch-like support elements;
   said punch-like support elements being arranged at a side of said stationary roll support which faces away from said pressure chamber; and
   said pressure chamber being located on the side of said seal means opposite said punch-like support elements.

2. The roll as defined in claim 1, wherein:

each of said support elements is structured as a punch-like element having hydrostatic bearing pocket means;

each of said support elements being arranged in a substantially cylindrical compartment provided at the stationary roll support and arranged between the related punch-like support element and said stationary roll support; and throttle channel means for flow communicating said bearing pocket means with said cylindrical compartment.

3. The roll as defined in claim 1, wherein:

said means defining at least one source of pressurized fluid medium for infeeding said pressurized fluid medium to said punch-like support elements infeeds said pressurized fluid medium to said punch-like support elements simultaneously with the infeed of said pressurized fluid medium to said pressure chamber.

* * * * *